July 5, 1927.
J. F. MacKAY
1,634,909
INCUBATOR
Filed March 1, 1924  2 Sheets-Sheet 1
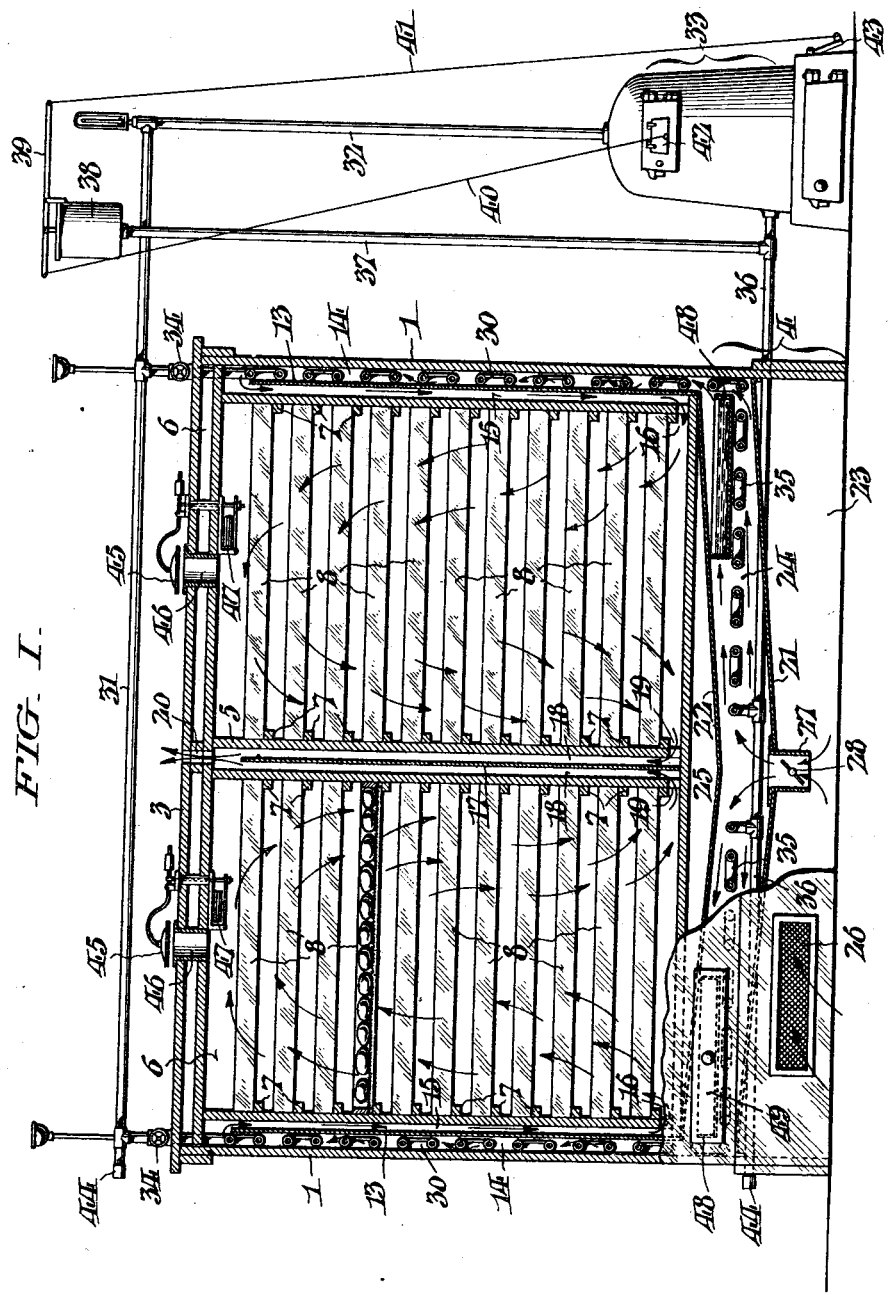
FIG. I.
WITNESSES:
INVENTOR:
John F. MacKay,
BY Fraley Paul
ATTORNEYS.

July 5, 1927.
J. F. MacKAY
1,634,909
INCUBATOR
Filed March 1, 1924 2 Sheets-Sheet 2
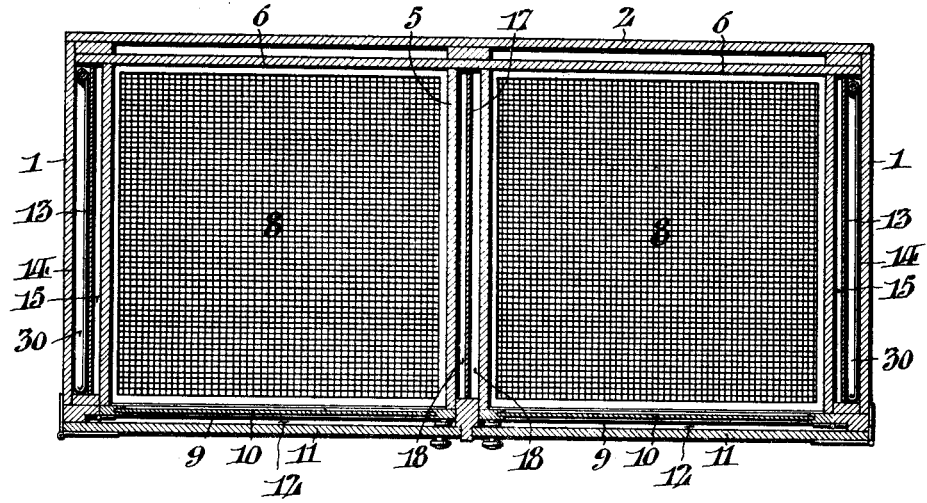
FIG. II.
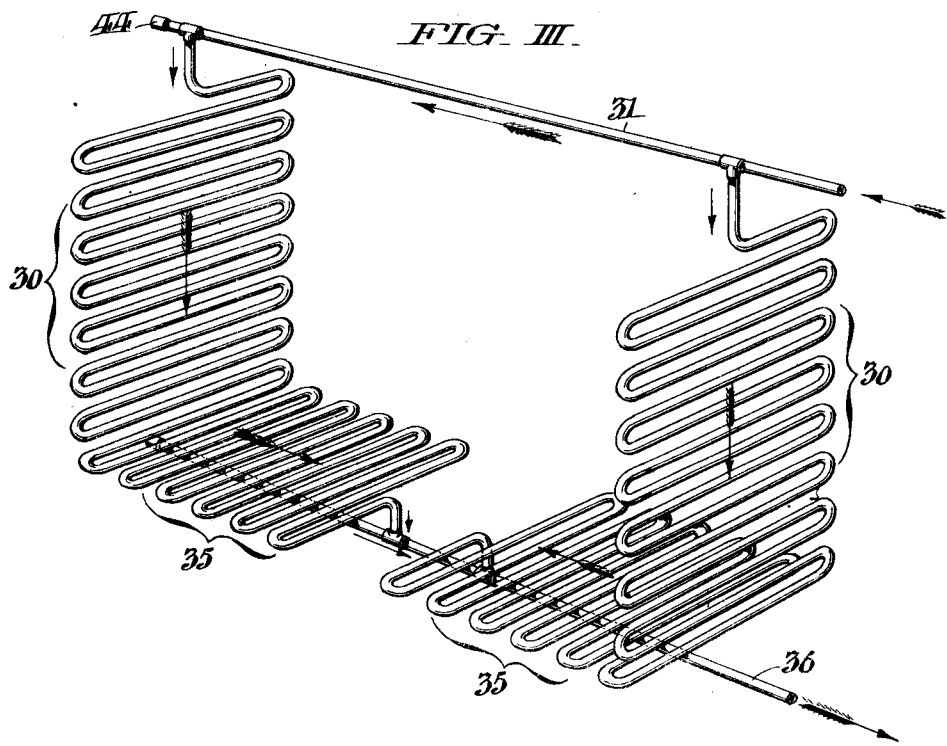
FIG. III.
WITNESSES:
INVENTOR:
John F. MacKay,
BY Fraley & Paul
ATTORNEYS.

Patented July 5, 1927.

1,634,909

UNITED STATES PATENT OFFICE.

JOHN F. MacKAY, OF LANCASTER, PENNSYLVANIA.

INCUBATOR.

Application filed March 1, 1924.  Serial No. 696,123.

This invention relates to incubators of large capacity, more particularly to those ordinarily termed "cabinet" incubators characterized by compartments wherein a multiplicity of trays for supporting the eggs during incubation, are arranged in superposed relation, as distinguished from the type of incubators with separate or individual incubating chambers for the egg trays and said chambers arranged in serial sequence horizontally.

Amongst the objects of my invention are to secure in a cabinet incubator, uniform flow and distribution of the heating medium throughout the incubating chambers containing the egg trays so that the entire surfaces of the eggs are at all times exposed to an atmosphere of even temperature and humidity; to enable control of the air circulation through the structure; to afford effective and reliable protection for the incubating chambers against the influence of extraneous atmospheric conditions; and to afford an incubator structure in the form of a complete unit (embodying the various features above pointed out) with provisions permitting addition and connection of other similar units if desired without requiring any alterations whatever in them.

Other objects and attendant advantages will be apparent as the following description proceeds of a typical embodiment of my invention.

In the drawings Fig. I is an illustration showing my improved cabinet incubator partly in elevation and partly in longitudinal section.

Fig. II is a sectional plan view of the same; and

Fig. III, an illustration more or less diagrammatically represented showing, in perspective, the novel heating system of the incubator.

As shown, the incubator structure is in the form of an enclosure having hollow side walls 1, a hollow back 2, a hollow top 3 and a hollow base 4. The interior of the enclosure is designed for use as an incubating compartment, and in the present instance is divided by a central hollow wall 5 into two separate chambers 6, each provided at opposite sides with ledges 7 adapted to separately support a series of egg trays 8 in spaced superposed relation. The egg trays 8 are constructed with foraminated bottoms such as obtainable by use of perforated sheet metal or wire mesh, so that air may freely flow through them in circulating within the incubating chambers. One of the egg trays in the left hand incubating chamber 6, as considered in Fig. I, is purposely shown in section to bring out the feature just described.

The incubating chambers 6 are individually accessible from the front of the structure through double doors (see Fig. II), the inner one designated at 9 being glazed as conventionally represented at 10, and the outer one marked 11, opaque, and the two being separated in each instance so as to jointly provide interspaces 12 at the front of the incubator intended to act normally as thermo-insulating dead air pockets. The outer opaque doors 11 not only serve to protect the eggs against the action of light as is desirable during certain stages of incubation, but also as safeguards against radiation of heat from within the chambers 6 through the glazed doors 10 which would otherwise result in absence of this provision. By my improved construction, it will thus be seen that the incubating chambers 6 are adequately thermo-insulated on all sides by virtue of the hollow side walls 1, the hollow front afforded as just described, and the hollow back 2, top 3 and bottom 4, so that uniform temperatures may be maintained within the enclosure regardless of extraneous conditions.

The hollow bottom 4 of the structure is subdivided by diaphragms 21—22 preferably of sheet metal, into a lower space 23, an intermediate horizontal passage 24 and an upper space 25, the latter serving as a dead air pocket beneath the floor of the incubating chambers 6. The lower space 23 is open to the exterior through gratings or screens such as shown at 26 in Fig. I, so that outside air can freely enter. The central or intermediate space 24, communicates directly with the outer subdivisions or passages 14 of the side walls 1, and at its center is provided with an inlet 27 through which air may pass from the lower space 23. This inlet 27 is arranged to be controlled by a removable disk or butterfly valve 28 capable of being operated from the exterior by any convenient means not shown. By reason of the convergent slope of the surfaces of the diaphragms 21—22 from a central point upwardly toward the side walls 1 as shown, air entering the passage 24 of the base 4 is obliged to divide in opposite directions and pass in equal proportions to the outer subdivisions or passages 14 of the said side walls.

Within each of the outer passages 14 of the side walls 1 is located a vertical bank of coils 30 for flow of hot water or other suitable fluid heating means, said coils being supplied from a common main or flow pipe 31 extending over the top of the enclosure, and said main in turn is supplied from a pipe 32 rising from a water jacket of an appropriate heater shown at 33 in Fig. I. A valve 34 is interposed in the lead to each of the coil banks 30, so that the flow in them may be individually controlled as may be required or desired. Located within the passage 24 of the hollow bottom 4 of the structure are horizontal coil banks 35 that are continuous with the vertical coil banks 30 aforementioned. (See Fig. II.) These horizontal coil banks 35, it will be observed, terminate near the center of the hollow bottom 4 and are there connected to a common return pipe 36 that extends horizontally through said bottom to the water jacket of the heater 33. From the return pipe 36 at the exterior of the incubator rises a stand pipe 37 that is surmounted by an expansion tank 38 with a float (not shown) for automatically actuating a lever 39 that controls, by means of chains 40—41 respectively, check and draft dampers 42—43 of the heater 33. The flow and return mains 31—36 are purposely extended at the ends remote from the heater 33 and their terminals closed by removable caps or plugs such as shown at 44 in Figs. I and III. As a consequence, other complete incubator units identical to the structure herein described may be added by simply substituting ordinary pipe couplings for the caps or plugs 44 and connecting up the flow and return pipes of the additional unit or units.

In operation, the air that enters the horizontal passage 24 of the hollow bottom 4 through the inlet 27 divides, and by the action of the sloping diaphragm surfaces 21, 22 is caused to pass laterally in opposite directions to the outer sub-divisions or passages 14 of the side walls 1, such flow being induced by heating of the air through contact with the pipe coils of the horizontal banks 35. In moving upwardly through the outer passages 14 of the side walls 1, the air is further heated by the vertical banks 30 of heating coils, and in passing over the top of the partitions 13 enters the inner passages 15 of said side walls. From thence the air travels downwardly in said inner passages 15 as indicated by the arrows in Fig. I, and into the respective incubating chambers 6 through the openings 16. By virtue of its heated condition, the air within the incubating chambers 6 rises first at one side to the top through the trays 8, and then reverses its direction and moves downwardly at the opposite sides of said chambers, such circulation being determined by the allocation of the inlet and outlet openings 16, 19. After completing the course in the incubating chambers 6 as explained, the air passes through the openings 19 into the passages 18 afforded at each side of a vertical partition 17 in the central wall 5 which thus serves as a common discharge duct from which the spent air finally escapes through the outlet 20 at the top. By reason of the double traverse of the heated air through the side walls 1, and the devious courses it is obliged to take through the structure, it will be appreciated that the flow may be very readily controlled with the aid of valve 28 in the fresh air inlet 27 in the bottom 4 of said structure.

In order to prevent overheating, I employ means whereby a certain quantity of the air is automatically released independently from each of the incubating chambers 6 when the temperature in them rises beyond a determined point as may happen when the eggs begin to generate animal heat. These means include dampers 45 that govern ports 46 leading from the incubating chambers 6, through the top of the enclosure, said dampers being automatically controlled by thermostatic devices 47 located within said chambers. These thermostatic devices 47 may be of any approved or standard design that will permit regulation for functioning automatically at the desired temperatures. As the temperature exceeds a certain degree within the incubating chambers 6, the thermostatic devices 47 cause lifting of the dampers 45 to uncover the ports 46 and thereby permit escape of air from said chambers 6. As a result, circulation of the air through the incubator is accelerated until the temperature within the incubating chambers 6 becomes normal, whereupon the dampers 45 are automatically caused to assume their normal or closed position and prevent further escape of air.

The moisture requisite to proper incubation is supplied by water pans 48 supported over the horizontal banks 35 in the bottom 4 of the incubator. For convenience in replenishing the supply of water from time to time, the pans 48 may be made in the form of drawers removable from the front of the structure, the ends of the drawers appearing as indicated at 49 in Fig. I.

Having thus described my invention, I claim:

1. An incubator in the form of an enclosure comprising an incubating compartment with hollow walls each affording up and down air circulation therethrough, and coil banks extending across the incubator bottom and vertically within the hollow walls effective to flow fluid heating medium in a reverse direction to that of the entering air whereby a circulatory atmosphere of even temperature is ensured.

2. An incubator in the form of an enclosure comprising an incubating compartment having hollow side walls each affording up and down air circulation therethrough from a communicating hollow bottom, and coil banks extending across the hollow bottom and vertically within the hollow walls to flow fluid heating medium in a reverse direction to that of the entering air whereby a circulatory atmosphere of even temperature is ensured.

3. An incubator in the form of an enclosure comprising an incubating compartment having hollow side walls affording up and down air circulation therethrough from a communicating hollow bottom, heating means extending vertically within the side walls, and continuous horizontally of the hollow bottom, to flow heating medium in a reverse direction to that of the entering air whereby a circulatory atmosphere of even temperature is ensured.

4. An incubator in the form of an enclosure comprising an incubating compartment having hollow side walls affording up and down passages communicating into a hollow bottom, and means located in both side walls and bottom effective to flow heating medium reversely to opposedly directed currents of air circulating inwardly through the side walls whereby a compartment atmosphere of even temperature is ensured.

5. An incubator in the form of an enclosure comprising an incubating compartment having hollow side walls affording up and down circulating passages and a hollow bottom, the outer interspaces of said side walls and bottom communicating, and continuous means located therein effected to floor heating medium in a reverse direction to that of entering air whereby a circulatory atmosphere of even temperature is ensured.

6. An incubator in the form of an enclosure affording an incubating compartment having sub-divided hollow enclosing walls providing up and down circulating passages communicating into a hollow bottom, and means continuous within the interspaces of said walls and hollow bottom effective to circulate a heating medium with opposed directional flow to that of the entering air.

7. An incubator in the form of an enclosure comprising an incubating compartment having sub-divided hollow enclosing walls affording up and down circulating passages, the outer interspaces of said walls having coil banks located in them adapted to direct a flow of heating medium downwardly through said outer interspaces and inwardly below the incubating compartment bottom.

8. An incubator in the form of an enclosure affording an incubating compartment having subdivided hollow side walls providing up and down circulating passages, a hollow bottom communicating into the outer sub-divisions of said side walls, and means comprising heating means extending downwardly through the hollow side walls and inwardly across the hollow bottom.

9. An incubator in the form of an enclosure affording an incubating compartment having sub-divided hollow side walls providing parallel up and down passages for conducting air into said incubating compartment, a communicating hollow bottom, and means co-extensive with the hollow side walls and communicating hollow bottom for heating the entering air as well as inducing circulation through the up and down passages from opposite directions before entering and traversing a devious course through the incubating compartment.

10. An incubator in the form of an enclosure affording an incubating compartment having hollow sub-divided side walls serviceable as up and down ducts for conducting air into the incubating compartment, a communicating hollow bottom, and means co-extensive with the hollow side walls and communicating hollow bottom functional to heat and induce flow of warm air first upward and then downward in opposite directions within said walls before entering and traversing a devious course through the incubating compartment.

11. An incubator in the form of an enclosure affording an incubating compartment having hollow side walls with a communicating hollow bottom and intermediate partitions to determine traverse of air through the interspaces of said walls first upwardly and then downwardly from opposite directions before entering the incubating compartment, means co-extensive with the upwardly directed wall interspaces and hollow bottom effective to heat and induce circulation of air, and a central sub-divided hollow wall in said incubating compartment affording parallel passages connecting with a common outlet for discharge of the spent air.

12. An incubator in the form of an enclosure affording an incubating compartment having hollow side walls and a hollow bottom, a partition subdividing each of the interspaces in said side walls, the sub-divisions communicating over the tops of the respective partitions to determine a path for air circulation upwardly through the outer subdivision of each wall and continuous downwardly in the inner subdivision before entering the incubating compartment, and coils located in the outer subdivision of each wall and hollow bottom to heat the air.

13. An incubator in the form of an enclosure affording an incubating compartment having hollow sub-divided side walls and a hollow bottom, the outer spaces of the interspaces communicating and determining opposed paths of air circulation therethrough into the incubating compartment, vertical heating coils in the side walls, and horizontal continuations of said coils terminating centrally within the inter-space at the enclosure bottom.

14. An incubator in the form of an enclosure affording an incubating compartment having hollow side walls and a hollow bottom, the interspaces communicating, vertical heating coils in the side walls, supplied from a common flow pipe extending horizontally above the top of the enclosure, and horizontal continuations of said coils terminating centrally in the interspace of the enclosure bottom and there connecting with a common return pipe extending horizontally through the enclosure bottom.

15. An incubator in the form of an enclosure affording separate incubating compartments, said enclosure having hollow side walls and a hollow bottom, a central subdivided hollow wall between the aforesaid compartments, a partition subdividing the interspace in each side wall, heating means co-extensive within the hollow bottom and side walls, the subdivisions of said side walls communicating over the tops of the respective partitions and the outer subdivisions in each instance communicating with the interspace in the bottom of the structure to determine divergent flows of warm air circulation from the bottom interspace upwardly through the outer subdivisions of the side walls, and downwardly through the inner subdivisions of the latter enroute to the incubating compartments and from thence exhausting through the central wall aforesaid as a common outlet.

16. An incubator in the form of an enclosure affording an incubating compartment having hollow side walls and a hollow bottom, an intervening partition subdividing the interspace in each side wall, the subdivisions communicating over the tops of the respective partitions and the outer subdivisions in each instance communicating with the interspace in the bottom, and a heating system comprising horizontal coils located in the bottom interspace of the enclosure with continuations extending vertically in the outer subdivision of the side walls, said system inducing opposed directional flow of heated air into the incubating compartment.

17. An incubator in the form of an enclosure affording separate incubating compartments, said enclosure having hollow side walls and a hollow bottom, a hollow sub-divided wall between the aforesaid compartments, a partition subdividing the interspace in each side wall, the subdivisions communicating over the tops of the respective partitions and the outer subdivisions in each instance communicating with the interspace in the bottom, a controllable inlet through which external air enters the interspace at the bottom, and heating coils for inducing divergent circulation of the air upwardly from the bottom of the enclosure through the outer subdivisions of the side walls, downwardly through the inner subdivisions of the latter into the incubating compartments and outwardly through the central wall aforesaid.

18. An incubator in the form of an enclosure affording separate incubating compartments, said enclosure having hollow side walls and a hollow bottom, a hollow sub-divided wall between the aforesaid compartments, a partition subdividing the interspace in each side wall, the subdivisions communicating over the tops of the respective partitions and the outer subdivisions in each instance communicating with the interspace in the bottom, a controllable air inlet centrally of the interspace at the bottom of the enclosure, deflecting surfaces inclined upwardly from a point over said inlet toward the hollow side walls, and heating coils inducing divergent flow of the air through the structure, the air entering the inlet being diverted by the deflecting surfaces in opposite directions toward the outer subdivisions of the side walls to flow upwardly in them, thence downwardly in the inner subdivisions of said walls into the incubating compartments, and from thence exhausting upwardly through the hollow dividing wall aforesaid as a common outlet.

19. An incubator in the form of an enclosure affording separate incubating compartments, said enclosure having hollow side walls and a hollow bottom, a partition subdividing the interspace in each side wall, the outer interspaces of said walls and hollow bottom communicating, a partitioned hollow wall between the compartments aforesaid defining a common spent air outlet, an air inlet centrally of the bottom wall, deflecting surfaces inclined upwardly from a point above the inlet toward the side walls, and heating means inducing circulation of the air through the enclosure, the air entering the inlet being diverted by the deflecting surfaces horizontally in opposite directions through the bottom interspace to the outer interspaces of the side walls for conduction downwardly through the inner interspaces into the incubating compartment, thence with devious flow through said compartment for upward exhaustion by way of the hollow dividing wall aforesaid.

20. An incubator in the form of an enclosure affording an incubating compartment having partitioned hollow side walls and a communicating hollow bottom heating means co-extensive within the hollow side walls and hollow bottom, a hollow central wall subdividing the incubating compartment into two separate chambers each adapted to accommodate a multiplicity of egg trays in superposed relation, said central wall having a medial partition defining parallel passages, the interspaces of the side walls serving as undulated passages for heated air enroute to the respective incubating chambers, and the interspaces of the central wall serving as a common outlet for the exit of air from said incubating chambers.

21. An incubator in the form of an enclosure affording an incubating compartment having hollow side walls and a hollow central wall subdividing the incubating compartment into two separate chambers each adapted to accommodate a multiplicity of egg trays in spaced superposed relation, heating means within the side walls for inducing circulation of air therethrough, the interspaces of the side walls serving as passages for air enroute to the respective incubating chambers, and the interspace of the central wall serving as a common passage for the exit of air leaving through openings at the bottom of said chambers, and a partition in the interspace of the central wall preventing short circuiting between the said apertures.

22. An incubator structure in the form of an enclosure affording separate incubation compartments having its side and intermediate walls sub-divided to provide up and down air passages, a hollow bottom subdivided by superspaced diaphragms affording connection between the side walls, heating means co-extensive within the side walls and hollow bottom for inducing air circulation therethrough, and means providing dead air pockets about the enclosure to protect the incubating compartments on all sides against extraneous temperature influence.

23. An incubator in the form of an enclosure comprising separate incubating compartments, said enclosure having hollow partitioned side walls affording up and down passages, a hollow sub-divided wall between the compartments defining upward spent air outlets, a hollow bottom with diaphragms setting apart a lower space in direct communication with the exterior, an intermediate passage communicating with the outer interspaces of the side walls and housing co-extensive heating means for inducing divergent air circulation through the enclosure, said interspace being provided centrally with an inlet to admit fresh air from the underlying space, and a third subdivision setting apart a dead air space between the floor of the incubating compartment and the intermediate passage of the bottom.

24. An incubator in the form of an enclosure affording an incubating compartment having hollow side walls, each with a vertical subdividing partition, a hollow central wall with a vertical subdividing partition, and a hollow bottom communicating directly with the outer subdivisions of the side walls and having a central fresh air inlet, heating means, and a valve to govern the inlet so that circulation of air through the enclosure induced by heating may be controlled, the air dividing in the hollow bottom toward the side walls flowing upwardly in the outer subdivisions of the latter then over the tops of the respective partitions in them and then downwardly in their inner subdivisions, and respectively into the incubating chambers, then after circulating in said chambers entering the respective subdivisions of the central hollow wall at the bottom and escaping through an outlet in the top of the enclosure.

25. An incubator in the form of an enclosure affording an incubating compartment having hollow side walls and a hollow bottom, the interspaces of the side walls communicating with that of the bottom and forming undulated passages for heated air enroute to the incubating compartment, a horizontal bank of heating coils in the bottom with continuations extending vertically within the interspaces of the side walls, and moisture pans overlying the coils in said hollow bottom, said pans being in the form of drawers removable from the front of the incubator.

26. A cabinet incubator comprising a series of separate enclosures each having a hollow side wall communicating with the lower interspace in a hollow bottom and sub-divided by a vertical hollow partition to afford juxtapositioned incubating chambers, each said chamber being adapted to accommodate a series of egg trays in superposed relation, means co-extensive with the hollow side walls and communicating hollow bottom for effecting circulation of opposedly flowing currents of heated air through the side walls and inwardly of the juxtapositioned incubating chambers with a devious flow, and thermostatically controlled means for governing the temperature of each individual incubating chamber.

In testimony whereof, I have hereunto signed my name at Philadelphia, Pennsylvania this 25th day of February, 1924.

JOHN F. MacKAY.